US008983775B2

(12) United States Patent
Hu et al.

(10) Patent No.: US 8,983,775 B2
(45) Date of Patent: Mar. 17, 2015

(54) SYSTEMS AND METHODS FOR CONNECTING AND OPERATING PORTABLE GPS ENABLED DEVICES IN AUTOMOBILES

(75) Inventors: Austin Hu, Bloomfield, MI (US); Junfeng Ma, Beijing (CN); Keming Zhao, Tianjin (CN); Kui Han, Beijing (CN); Yang Liu, Beijing (CN); Xi Wei Fan, Beijing (CN)

(73) Assignee: Flextronics AP, LLC, Broomfield, CO (US)

( * ) Notice: Subject to any disclaimer, the term of this patent is extended or adjusted under 35 U.S.C. 154(b) by 817 days.

(21) Appl. No.: 12/553,269

(22) Filed: Sep. 3, 2009

(65) Prior Publication Data

US 2010/0088029 A1   Apr. 8, 2010

Related U.S. Application Data

(60) Provisional application No. 61/093,983, filed on Sep. 3, 2008.

(51) Int. Cl.
 *G01C 21/36* (2006.01)
(52) U.S. Cl.
 CPC ........ *G01C 21/3664* (2013.01); *G01C 21/3661* (2013.01); *G01C 21/3688* (2013.01)
 USPC .......................................... 701/483; 701/487
(58) Field of Classification Search
 USPC ....................................................... 701/213
 See application file for complete search history.

(56) References Cited

U.S. PATENT DOCUMENTS 5,856,827 A   1/1999  Sudo
6,463,304 B2  10/2002 Smethers
6,608,637 B1   8/2003 Beaton et al.
6,768,450 B1 *  7/2004 Walters et al. ........... 342/357.59
6,889,064 B2 *  5/2005 Baratono et al. ........... 455/569.2
6,944,482 B2   9/2005 Engstrom et al.
7,092,495 B2   8/2006 Kraft et al.

(Continued)

FOREIGN PATENT DOCUMENTS

KR   10-2005-0123280 A   12/2005
KR       10-0742404 B1    7/2007

OTHER PUBLICATIONS

International Search Report from PCT/US2009/055877 mailed Apr. 1, 2010.

(Continued)

*Primary Examiner* — Shelley Chen
(74) *Attorney, Agent, or Firm* — Haverstock & Owens LLP (57) ABSTRACT

An electronic device that is operable to provide navigation information to a user by utilizing the navigation system of a separate mobile device, such as a GPS-enabled mobile phone. The electronic device includes a communication interface for communicating navigation data between the mobile device and the electronic device. The electronic device also includes a display for displaying the navigation data received from the mobile device. The display of the electronic device may be larger than the display of the mobile device, such that a driver of an automobile may use the electronic device to provide a more desirable viewing experience. Further, the electronic device may include a user interface, such as a touch screen, that allows a user to access and control the navigation functions of the mobile device. The electronic device may also be operable to communicate with other portable electronic devices.

25 Claims, 4 Drawing Sheets

(56) References Cited

U.S. PATENT DOCUMENTS

| | | | |
|---|---|---|---|
| 7,188,320 B1 | 3/2007 | Lander | |
| 7,336,282 B2 | 2/2008 | Kato et al. | |
| 7,693,556 B2 | 4/2010 | Park et al. | |
| 7,987,046 B1 * | 7/2011 | Peterman et al. | 701/454 |
| 2001/0003097 A1 | 6/2001 | Jeoung | |
| 2001/0012790 A1 | 8/2001 | Park et al. | |
| 2001/0046886 A1 | 11/2001 | Ishjgaki | |
| 2002/0072395 A1 | 6/2002 | Miramontes | |
| 2002/0077156 A1 | 6/2002 | Smethers | |
| 2003/0064757 A1 | 4/2003 | Yamadera et al. | |
| 2004/0220723 A1 * | 11/2004 | Gould Bear et al. | 701/200 |
| 2006/0224386 A1 | 10/2006 | Ikegami | |
| 2006/0267931 A1 | 11/2006 | Vainio et al. | |
| 2007/0117080 A1 | 5/2007 | Hsi | |
| 2007/0213092 A1 * | 9/2007 | Geelen | 455/556.1 |
| 2008/0262731 A1 * | 10/2008 | Pai | 701/300 |
| 2009/0189803 A1 * | 7/2009 | Beason | 342/357.1 |
| 2009/0225026 A1 * | 9/2009 | Sheba | 345/156 |
| 2009/0248419 A1 | 10/2009 | Spaulding et al. | |
| 2010/0220250 A1 * | 9/2010 | Vanderwall et al. | 348/837 |

OTHER PUBLICATIONS

Canada Office Action, Application No. 2,731,918, Classification: GO8G 1/0969 (2006.01), dated Apr. 12, 2013, 3 pages.

China Office Action, Application No. 200980134380.5, dated May 7, 2013, 49 pages.

Japan Office Action, Application No. 2011-525301, dated Jul. 9, 2013, 6 pages.

\* cited by examiner

SYSTEMS AND METHODS FOR CONNECTING AND OPERATING PORTABLE GPS ENABLED DEVICES IN AUTOMOBILES

CROSS-REFERENCE TO RELATED APPLICATION

This application claims priority under 35 U.S.C. 119 to U.S. Provisional Application No. 61/093,983, entitled: "SYSTEMS AND METHODS FOR CONNECTING AND OPERATING PORTABLE GPS ENABLED DEVICES IN AUTOMOBILES," filed on Sep. 3, 2008, the contents of which are incorporated herein as if set forth in full.

BACKGROUND

In recent years, navigation systems have become increasingly prevalent in automobiles to assist drivers in locating their intended destinations. A navigation system generally operates by analyzing position data provided by Global Positioning System (GPS) satellites and received by a GPS receiver. Navigation systems may also analyze position or motion data from other sources, including motion sensors and digital maps, to determine the position and velocity of a vehicle.

Typically, the navigation system displays a detailed digital map for the driver of an automobile to view. In addition to vehicle location, the map may also include features such as streets, buildings, rivers, restaurants, gas stations, or other points of interest. The map data may be stored in solid state memory (e.g., ROM or flash memory), optical media (e.g., CD or DVD), magnetic media (e.g., a hard disk drive), or the like. One scheme is to have a base map permanently stored in ROM that can be augmented with detailed information for a particular region that the driver is interested in. The map data may generally be updated by coupling the receiver to the updated data using several types of computer connections including, but not limited to, wired connections (e.g., USB), wireless connections (e.g., Bluetooth and Wi-Fi), and card readers.

Navigation systems may also display routes to destinations and maneuvers (e.g., turns or merges) needed to reach the destination. As the vehicle changes position, a vehicle position marker on the map may change to reflect the updated position of the vehicle. Alternatively, the digital map may be scrolled, while the vehicle position marker may be fixed at a predetermined position, such as the center of the display. Further, navigation systems may include an audio output for providing voice directions (e.g., "turn left on Main Street in one mile") so that the driver does not have to look away from the road to determine the directions to a destination.

To date, three approaches to automobile navigation systems have been most commonly used. The first is an automobile navigation system that is pre-integrated into the automobile. These systems usually include a large display that may be built into the dash of an automobile. These built-in systems may also be connected to systems of the automobile (e.g., audio system, speedometer, or the like) to further enhance the performance of the navigation system. These systems are typically very costly, and it may be difficult to add them to cars aftermarket.

The second approach is a portable navigation device (PND) that may be sold to users that do not have a pre-installed car navigation system. Portable navigation devices generally include a GPS receiver, digital maps, a display, audio output, and a user interface (e.g., a touch screen). PND's have become a popular solution for aftermarket car applications. However, these portable navigation devices may also be expensive because they include GPS hardware, proprietary map data, and other costly features.

The third and most recent approach is a mobile phone with a built in GPS receiver. GPS enabled mobile phones are becoming increasingly popular. One particularly attractive aspect of GPS enabled mobile phones is the relatively low cost to provide a user the additional GPS and navigation functions. Its compact size makes it even more portable as compared to PND. However, the display size of most mobile phones is around two to three inches, which makes them inconvenient for drivers to view and operate while driving an automobile.

It is against this background that the systems and methods for connecting and operating portable GPS enabled devices in automobiles have been invented.

SUMMARY

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

According to a first aspect, an electronic device operable to provide navigation information to a user by utilizing a navigation system of a separate GPS-enabled mobile device is provided. The electronic device includes a communications interface for communicating navigation information between the GPS-enabled mobile device and the electronic device. The electronic device also includes a display for displaying the navigation information, and a user interface that permits the user to selectively control navigation functions of the GPS-enabled mobile device using the electronic device.

According to a second aspect, a method for providing navigation information to a user of an electronic device is provided. The method includes receiving input from the user of the electronic device through a user interface, the received input requesting navigation information. The method further includes sending the received input to a GPS-enabled mobile device through a communications interface, and receiving navigation information from the GPS-enabled mobile device on the electronic device through the communications interface. Additionally, the method includes displaying the received navigation information on a display of the electronic device.

According to a third aspect, an electronic device operable to provide audio and visual (A/V) data to a user of a mobile device is provided. The electronic device includes a communications interface for communicating the A/V data between the mobile device and the electronic device. The electronic device also includes a display for displaying the A/V data, and a user interface that permits the user to selectively control one or more functions of the mobile device using the electronic device.

In addition to the exemplary aspects and embodiments described above, further aspects and embodiments will become apparent by reference to the drawings and by study of the following descriptions.

DETAILED DESCRIPTION

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

Figure 1:
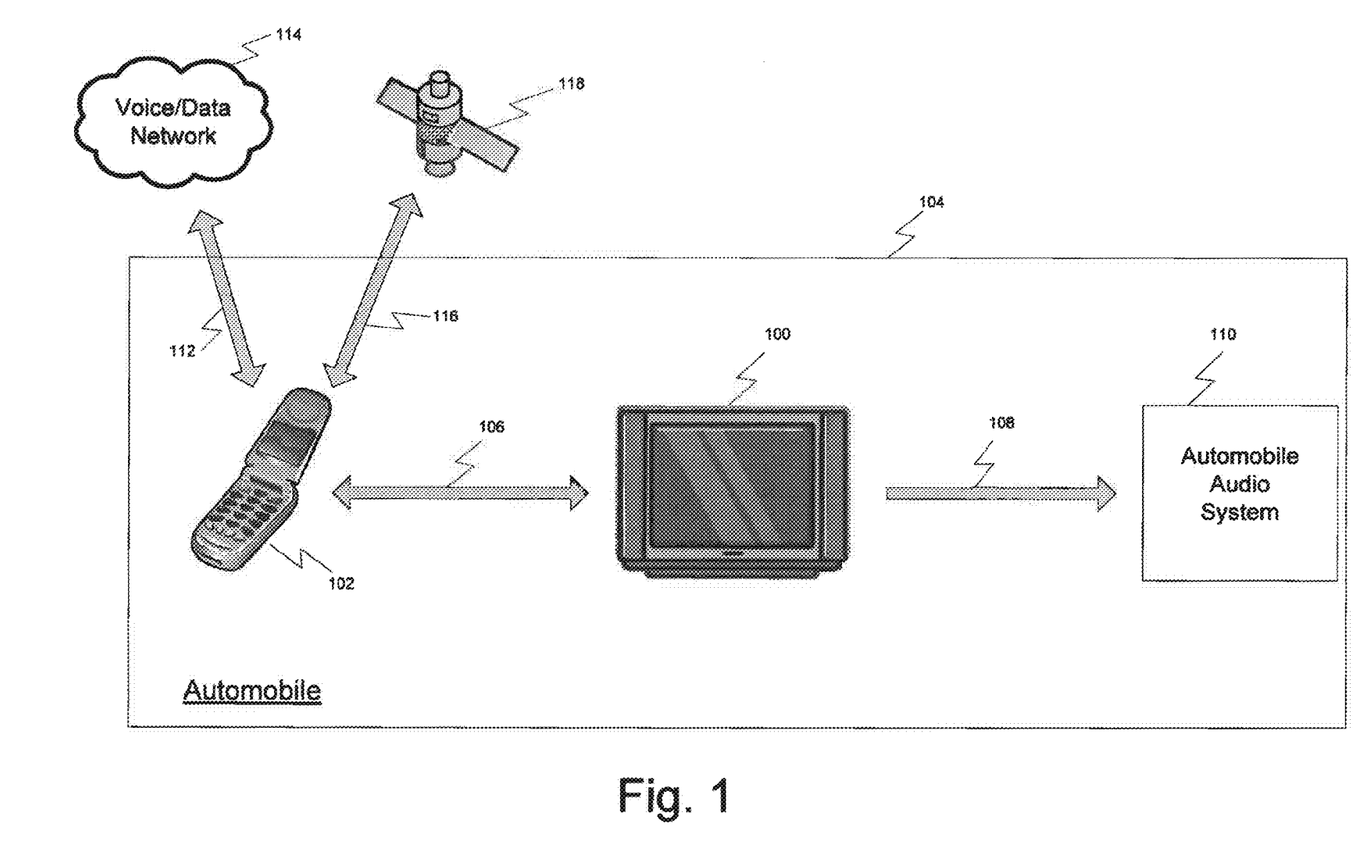
FIG. 1 illustrates an exemplary embodiment of a navigation via mobile phone (NVMP) device.

Turning to FIG. 1, an exemplary embodiment of a navigation via mobile phone (NVMP) device 100 is shown. The NVMP device 100 may be removably or fixedly mounted inside an automobile 104. For example, the device 100 may be attachable to a windshield of the automobile 104 via a suction cup. Alternatively, the device 100 may be portable. In operation, the NVMP device 100 may be coupled to a GPS enabled mobile device, such as a mobile phone 102, such that the GPS navigation features provided by the mobile phone 102 may be viewed on a display of the NVMP device 100. That is, the NVMP device 100 may be used to improve the usability of the navigation functions of the mobile phone 102 in an automobile environment by providing a larger display, superior audio features, and more user-friendly operation controls (e.g., a touch panel). As will be appreciated, the cost of the NVMP device 100 may be relatively low, since the hardware and software associated with navigation systems (e.g., GPS receiver, proprietary map data, or the like) resides on a mobile phone, rather than inside the NVMP device 100 itself. The specific functionality of the NVMP device 100 is described in detail below.

The NVMP device 100 may be coupled to the mobile phone 102 using a communication link 106. The link 106 may include a wired interface (e.g., USB), a wireless interface (e.g., Bluetooth, Wi-Fi, Wi-MAX, High Speed Packet Downlink Access (HSPDA), 3G network, or the like), or a combination thereof. Further, the communication link 106 may be used to send and receive commands, visual data, and audio data between the NVMP device 100 and the mobile phone 102. For example, the audio and video output of the mobile phone 102 may be replicated on the NVMP device 100 so that a driver of the automobile 104 may view the larger display of the NVMP device 100, rather than the smaller display of the mobile phone 102.

In one or more embodiments, the NVMP device 100 may be configured to automatically detect the presence of the mobile phone 102. For example, the NVMP device 100 may detect signals sent from the mobile phone 102, determine specific information about the phone 102 (e.g., brand, operating system, communication interfaces supported, and the like), and establish a communication link with the phone 102 dependent upon the configuration of the phone 102.

To provide audio functionality (e.g., turn-by-turn voice directions), the NVMP device 100 may be coupled to an audio system 110 of the automobile 104 via a communication link 108. In one embodiment, the communication link 108 includes an FM transmitter that may be used to send audio signals from the NVMP device 100 to an FM tuner of the audio system 110. In another embodiment, the communication link 108 may include a wired cable, such as a 3.5 mm cable that may be plugged into an auxiliary input of the audio system 110. Any other suitable communication link may be employed. Additionally or alternatively, the NVMP device 100 may include speakers that may be used to provide audio capability. Further, the NVMP device 100 may be operable to receive audio signals from the mobile phone 102, and to provide the audio signals to the driver using the above-noted audio output functionality.

The NVMP device 100 may also be configured to send and receive commands to and from the mobile phone 102. Such commands may include navigation control (e.g., entering and modifying a destination, searching for a point of interest, or the like), audio or video control, or other commands. To enable a driver to operate the navigation system of the mobile phone 102, the NVMP device 100 may include a user interface. In one embodiment, the user interface includes a touch screen. Additionally or alternatively, the user interface of the NVMP device 100 may include one or more buttons, scroll wheels, or other control mechanisms. Further, the user interface may include a microphone for receiving voice commands from a driver, so that the driver may operate the navigation system "hands-free" while driving the automobile 104. The hands-free functionality may also provide the ability to place and receive phone calls using the NVMP device 100 and the mobile phone 102, such that the driver may use the NVMP device 100, which is coupled with the mobile phone 102, to receive phone call voice data, and use the microphone coupled with NVMP device 100 to answer the phone call without directly using the mobile phone 102. To use the NVMP device 100, a user may first bring the mobile phone 102 into a position where it can be coupled to the device 100. For example, if the communication link 106 is a wireless link, the mobile phone 102 may be anywhere inside the automobile 104. If the communication link 106 is a USB link, then the user may connect the mobile phone 102 to the NVMP device 100 using a USB cable. Then, software associated with the NVMP device 100 and the mobile phone 102 may automatically or manually place them in communication with each other. Once communication has been established, a driver may operate the user interface of the NVMP device 100 to control the navigation system or other features of the mobile phone 102.

The mobile phone 102 may be linked to a voice/data network 114 and GPS satellites 118 through communication links 112 and 116, respectively. Those skilled in the art will readily recognize the connectivity of GPS and data enabled mobile phones.

The NVMP device 100 may also be used in conjunction with other functions of the mobile phone 102. For example, in the case where the mobile phone 102 is operable to access the Internet, the NVMP device 100 may be used to display and navigate various web pages. Additionally, the NVMP device 100 may be used to place calls or send text messages. It should be appreciated that the NVMP device 100 may be used to perform any of the functions of the mobile phone 102. In the above-noted examples, the NVMP device 100 may be preferable over the mobile phone 102 due to the larger display, user-friendly controls, or other reasons.

Figure 2:
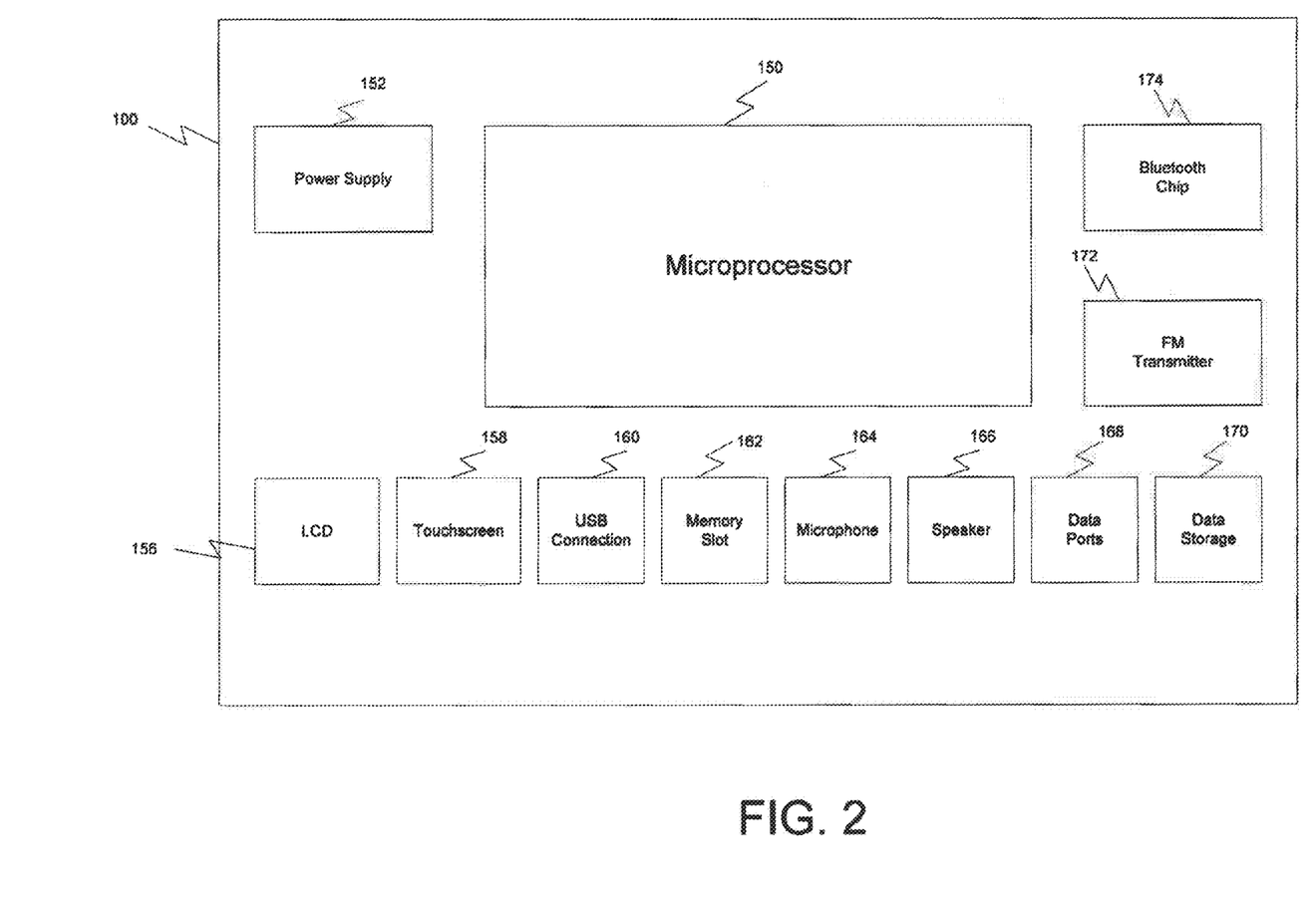
FIG. 2 illustrates a hardware block diagram for the NVMP device shown in FIG. 1.

FIG. 2 illustrates an exemplary hardware block diagram for the NVMP device 100 shown in FIG. 1. The device 100 includes a microprocessor 150 that is operable to interface with other components, store and execute software instructions, and perform other similar functions. As an example, the microprocessor 150 may include an MX21 series microprocessor available from Freescale Semiconductor, Inc., or an S3C2443 microprocessor from Samsung.

To communicate with GPS enabled mobile phones such as the mobile phone 102 shown in FIG. 1, the NVMP device 100 may include a Bluetooth chip 174. One example of a suitable Bluetooth chip is the BC04 Bluetooth module from a Bluetooth chipset supplier, Cambridge Silicon Radio (CSR), although other suitable Bluetooth chips may be used as well. The BC04 Bluetooth module provides a fully compliant Bluetooth system for data and voice communications. The BC04 Bluetooth module is operable to interface with the microprocessor 150 via USB or UART, and is Enhanced Data Rate (EDR) compliant for both 2 Mbps and 3 Mbps modulation modes. The BC04 also provides a voice interface supported PCM protocol. Further, the module and device firmware is fully compliant with the latest Bluetooth specifications (e.g., v2.0, v3.0, and the like). In operation, a user may receive a phone call on a mobile phone that is coupled to the NVMP device 100 using the Bluetooth interface. The NVMP device 100 may indicate to the user that an incoming call is present (e.g., by an audio or video indicator), and allow the user to answer the call and converse with the person on the other end. As can be appreciated, the Bluetooth interface also permits the user to place calls on a mobile phone using the NVMP device 100.

It should be appreciated that other Bluetooth protocols or profiles may be utilized. For example, the Advanced Audio Distribution Protocol (A2DP) may be used to provide mono or stereo audio transfer for the Bluetooth chip 174 to transfer audio between the NVMP device 100 and the mobile phone 102. Additionally, other protocols including Serial Port Profile (SPP), Audio/Video Remote Control Profile (AVRCP), may be used.

To display the video data received from a mobile phone, the NVMP device 100 may also include a liquid crystal display (LCD) 156. Generally, the LCD 156 may be relatively large compared to a display of a typical mobile phone. For example, the diagonal dimension of the LCD 156 may be around three to six inches, or greater. Further, to facilitate user interaction, a touch screen 158 and associated electronics may be provided as well. In addition to the touch screen 158, the device 100 may also include a microphone 164 that is operable to receive voice commands from a user. For example, a driver may say, "where is the nearest gas station," and the device 100 may then use the navigation system of the mobile phone 102 to provide directions to the nearest gas station.

As discussed above in relation to FIG. 1, the device 100 may also include an FM transmitter 172 for supplying an audio signal to the audio system 110 (shown in FIG. 1) of the automobile 104. In operation, the FM transmitter 172 may transmit turn-by-turn voice instructions at a predetermined or selectable FM frequency (e.g., 89.1 MHz, 88.5 MHz, or the like). To receive the audio instructions, a driver may tune an FM tuner of the audio system 110 to the corresponding frequency. Additionally or alternatively, the device 100 may include a speaker 166 and related drivers for providing an audio output, such as voice navigation directions, music, phone calls, ringtones, or any other audio signal.

The NVMP device 100 may also include data storage 170 for storing data such as media (e.g., music, video, photos, or the like), user profiles, data files, or the like. The data storage 170 may include solid state memory (e.g., ROM or flash memory), optical media (e.g., CD or DVD), magnetic media (e.g., a hard disk drive), or any combination thereof. Further, the device 100 may include one or more memory slots 162 for receiving one or more external memory cards (e.g., Smart Media Card, Secure Digital Card, Multimedia Card, Memory Stick, or the like). As can be appreciated, using the data storage 170 and/or other communications interfaces (e.g., Bluetooth, network protocol, or the like), the NVMP device 100 may be used to implement streaming video or video conferencing applications.

The NVMP device 100 may also include a USB connection 160 and other data ports 168 for coupling the device 100 to other devices. For example, the USB connection 160 may be used to couple the NVMP device 100 to the mobile phone 102. Further, the other data ports 168 may include connections for a variety of types of consumer devices including, but not limited to, mobile phones, PDAs, portable audio/video players, digital cameras, memory cards, or the like. For example, a user may use the data ports 168 to connect a media player to the NVMP device 100, so that users in the automobile may view (using the LCD 156) or listen to (using the speaker 166) to audio/video files.

A power supply 152 is also included in the device 100 to supply power to all the aforementioned components. The power supply 152 may receive power from an external source, such as the battery of an automobile. Further, the power supply 152 may be operable to supply a plurality of voltage and current levels as required by the components of the device 100. The power supply may also include a built-in rechargeable battery that can be charged, e.g., through a cable connecting to a vehicle's power supply. The built-in battery configuration may provide power for operating the device 100 when using it outside an automobile. Further, the NVMP device 100 may include a wired interface (e.g., a USB interface, a proprietary interface, or other wired interface) that may be connected to a mobile phone such that the power supply 152 may be used to recharge the battery of the mobile phone.

Figure 3A:
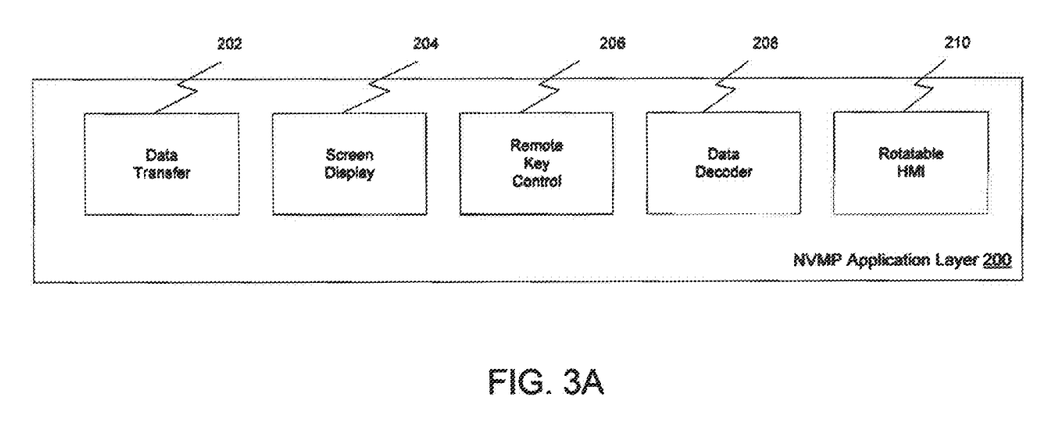
FIG. 3A illustrates a block diagram of a software application layer for one embodiment of an NVMP device.

FIG. 3A illustrates a block diagram of a software application layer 200 for one embodiment of a NVMP device, such as the NVMP device 100 shown in FIGS. 1 and 2. This application layer 200 includes a plurality of modules that together provide the functionality of the NVMP device. The application layer 200 may run on an operating system associated with the NVMP device. As an example, a suitable operating system may include the Windows CE operating system or a Linux operating system.

The application layer 200 may include a data transfer module 202 that is operable to transfer commands, voice data, and audio data between the NVMP device and a GPS enabled mobile device, such as the mobile phone 102 shown in FIG. 1. The data transfer module 202 may include logic that is configured to recognize a particular type of mobile device that is coupled to the NVMP device, and to format the data transfer accordingly. Additionally or alternatively, the mobile devices may be equipped with a corresponding data transfer module that is operable to communicate with the data transfer module 202, such that the format for data transfer is standardized for all compatible devices.

The application layer 200 may also include a screen display module 204 that is operable to control a display of the NVMP device. In operation, the screen display module 204 may receive video data from the data transfer module 202, and output the data to the display of the NVMP device.

The application layer 200 may also include a remote key control module 206 that is operable to receive commands from a user (e.g., touch screen touches, voice commands, or other control mechanisms), and to transcode those commands into a format that is suitable for the mobile device that is coupled to the NVMP device. The data from the remote key control module 206 may be provided to the associated mobile phone using the data transfer module 202 described above.

The application layer 200 may further include a data decoder 208 that is operable to decode various types of data including, but not limited to, command data, audio data (e.g., mp3, WMA, or FM), video data (e.g., MPEG-4 or WMV), or the like. Further, the application layer 200 may include a rotatable human-machine interface (HMI) module 210 that is operable to allow users to control the NVMP device from various positions. For example, the rotatable HMI module 210 may permit the NVMP device to be operated by both a driver of an automobile and a passenger sitting in the front passenger seat of the automobile. Further, the rotatable HMI 210 may be operable to sense the orientation of the NVMP device 100 or mobile phone 102, and adjust the orientation of the display accordingly (e.g., vertical or horizontal).

Figure 3B:
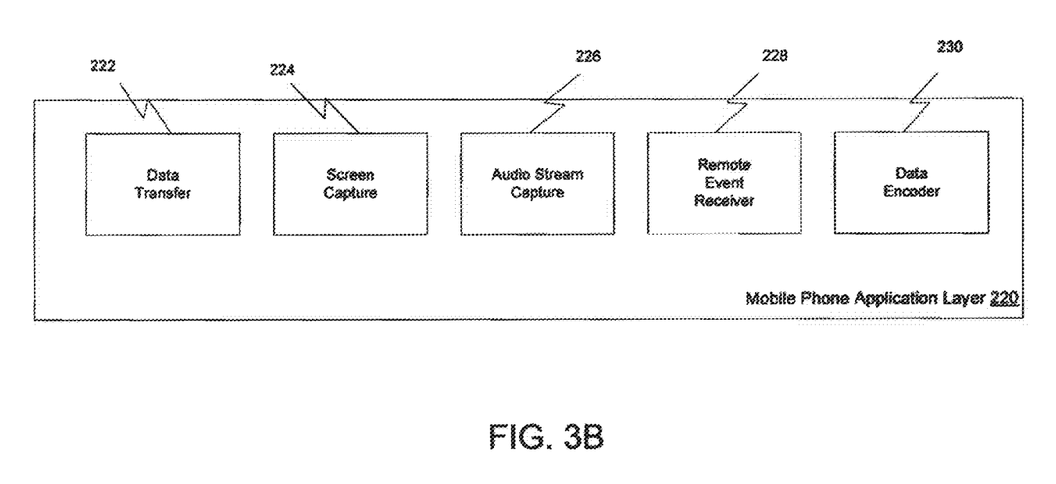
FIG. 3B illustrates a block diagram of a software application layer for a mobile phone that is operable to communicate with an NVMP device.

FIG. 3B illustrates a block diagram of a software application layer 220 for a mobile phone that is operable to communicate with an NVMP device, such as the mobile phone 102 shown in FIG. 1. The application layer 220 may be executed by an operating system of a mobile phone. As an example, the S60 or UIQ platforms that operate on the Symbian operating system may be suitable platforms. Similar to the application layer 200, the application layer 220 may include a data transfer module 222 that is operable to transfer data between the mobile phone and an NVMP device.

The application layer 220 may also include a screen capture module 224 and an audio stream capture module 226 that are operable to capture the display and audio output of the GPS-enabled mobile phone so that they may be transferred to (via the data transfer modules 222 and 202) and replicated by the NVMP device.

The application layer 220 may also include a remote event receiver 228 that is operable to transcode commands received from the NVMP device into operations of the mobile phone. For example, a user may operate the touch screen of the NVMP device to select a destination address. In turn, the remote event receiver module 228 may receive the command, and provide the command to the navigation software of the mobile phone. The layer 220 may further include a data encoder 230 for encoding data received from the NVMP application layer 200. Such data may include commands, audio media, video media, or any other type of data.

Figure 4:
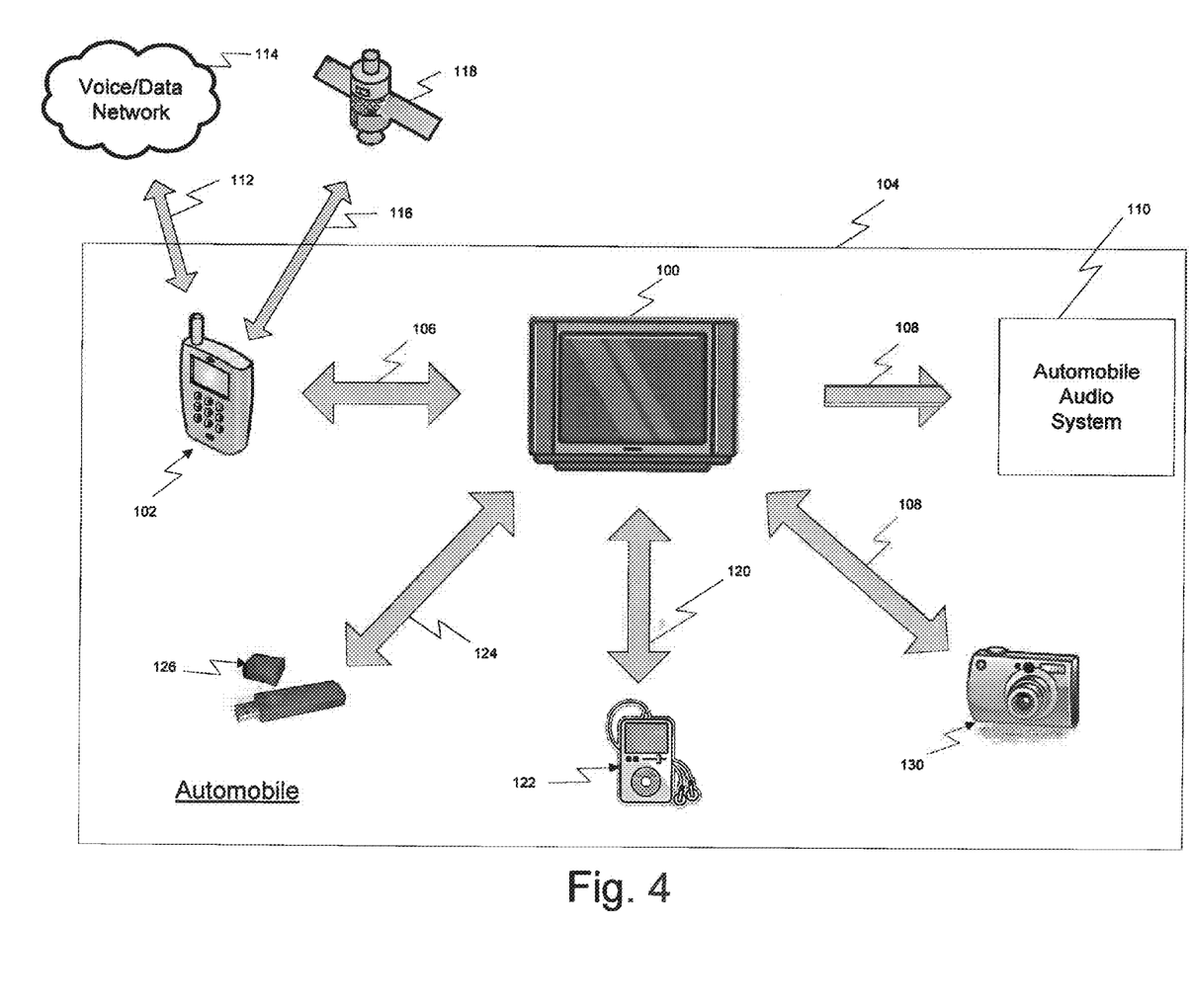
FIG. 4 illustrates another exemplary embodiment of an NVMP device.

FIG. 4 illustrates another exemplary embodiment of the NVMP device 100. In this embodiment, the NVMP device 100 is operable to be coupled to a plurality of consumer devices including a USB flash drive 126, a portable media player 122, and a digital camera 130 via communication links 124, 120, and 108, respectively. The communication links 108, 120, 124 may be any wired or wireless communications interfaces. For example, a user may utilize the display of the NVMP device 100 to view images or videos stored by the digital camera 130. Further, a user may transfer data (e.g., image files) from the digital camera to data storage of the NVMP device 100 where they may be viewed at a later date. Similarly, media from the media player 122 may be viewed, heard, or stored using the NVMP device 100.

The NVMP device 100 may also include functionality for providing emergency assistance to users that may need help while in an automobile. For example, the NVMP device 100 may be operable to receive a voice or touch command from a driver of the automobile 104 that indicates that the driver needs assistance. In turn, the NVMP device 100 may use the GPS, voice, and/or data functionality of the mobile phone 102 to contact an emergency dispatch service. As can be appreciated, the device 100 may utilize the GPS system to provide the dispatch service with location information of the automobile to assist the dispatch service in finding the automobile. Further, the device 100 may include hands-free audio/video communication between the user of the device 100 and dispatch personnel to provide a more user-friendly communication interface. In this regard, the voice network 114 of the mobile phone 102 may be used by the device 100 to provide the audio communication interface between a user and dispatch personnel.

Although the NVMP device 100 is described above as being a standalone device, it is not so limited. In one or more embodiments, the functionality of the NVMP device may be incorporated into another device. For example, the NVMP device functionality may be included as part of a vehicle's center console, audio system, video system, navigation system, rear-view mirror, and the like. In one or more cases, the NVMP device functionality may be integrated into a device already including a display, thereby eliminating the need for a separate display for the NVMP device. By integrating the NVMP device functionality with one or more other devices, significant advantages such as reduce cost, reduced complexity, and reduced physical space requirements may be achieved.

It should be appreciated that the embodiments disclosed herein may provide several advantages. For example, the usability of the navigation functions of a mobile phone in an automobile environment may be improved by providing a larger display, superior audio features, and more user-friendly operation controls (e.g., a touch panel, voice commands, and the like). Further, the cost of the devices described herein may be relatively low, since the hardware and software associated with navigation systems (e.g., GPS receiver, proprietary map data, or the like) resides on a mobile phone, rather than inside the devices themselves. In addition, features such as communicating with a plurality of electronic devices, charging the batteries of mobile phones, and other features may be desirable for a variety of applications. Those skilled in the art will readily recognize other features and advantages provided by the embodiments described herein.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

The invention claimed is:

1. An electronic device operable to provide navigation information to a user by utilizing a navigation system of a separate G.P.S.-enabled mobile device, the electronic device comprising:
    a data transfer module configured to automatically detect presence of the G.P.S.-enabled mobile device by detecting signals sent from the G.P.S.-enabled mobile device, determining specific information about the G.P.S.-enabled mobile device and establishing a communication link with the G.P.S.-enabled mobile device based on a configuration of the G.P.S.-enabled mobile device;
    a communications interface for communicating navigation information between the G.P.S.-enabled mobile device and the electronic device;
    a display for displaying the navigation information;

a user interface that permits the user to selectively control navigation functions of the G.P.S.-enabled mobile device using the electronic device; and a rotatable human-machine interface (HMI) module that is operable to allow users to control the electronic device from various positions, wherein the HMI module is configured to sense an orientation of the GPS-enabled mobile device and to adjust an orientation of the displayed information according to the orientation;

wherein the electronic device is a standalone device that, when connected to the G.P.S.-enabled mobile device, can provide the navigation information to a user whether or not the electronic device is located in an automobile.

2. The electronic device of claim 1, wherein the electronic device is selectively attachable to a portion of an automobile.

3. The electronic device of claim 1, wherein the communications interface includes a Bluetooth interface.

4. The electronic device of claim 1, wherein the communications interface includes a communications interface selected from the group consisting of:
a USB interface; an FM interface; a Wi-Fi/Wi-max interface; a 3G voice data network interface; a WCDMA interface; and a HSDPA interface.

5. The electronic device of claim 1, wherein the user interface includes a touch screen.

6. The electronic device of claim 1, wherein the G.P.S.-enabled mobile device includes a G.P.S.-enabled mobile phone.

7. The electronic device of claim 1, further comprising a data storage module operative to store audio or video data.

8. The electronic device of claim 1, further comprising an audio output system.

9. The electronic device of claim 8, wherein the audio output system includes an FM transmitter.

10. The electronic device of claim 1, wherein the user interface includes a microphone operative to receive voice data from the user.

11. The electronic device of claim 1, further comprising:
a data port that is operable to selectively couple a separate consumer device to the electronic device.

12. The electronic device of claim 11, wherein the consumer device is a device selected from the group consisting of:
a mobile phone; a personal digital assistant (PDA); a portable media player; a portable computer; a memory card; and a digital camera.

13. The electronic device of claim 1, further comprising a power supply operative to charge a battery of a G.P.S.-enabled mobile device connected to the electronic device.

14. The electronic device of claim 13, wherein the power supply of the electronic device is connectable to a G.P.S.-enabled mobile device via a USB cable.

15. The electronic device of claim 13, wherein the power supply includes a built-in rechargeable battery.

16. The electronic device of claim 1, wherein the communication interface is operable to provide a two-way communication channel for sending and receiving voice data or messages between the G.P.S.-enabled mobile device and the electronic device.

17. The electronic device of claim 1, wherein the electronic device is configured to permit a user to operate a non-navigation function of the G.P.S.-enabled mobile device using the user interface and the display.

18. The electronic device is claim 17, wherein non-navigation function of the G.P.S.-enabled device includes a function selected from the group consisting of:
making a phone call; sending or receiving a text message; and viewing web pages.

19. A method for providing navigation information to a user of an electronic device, the method comprising:
automatically detecting presence of a G.P.S.-enabled mobile device to thereby establish a communication link with the G.P.S.-enabled mobile device;
receiving input from a user of the electronic device through a user interface, the received input requesting navigation information;
sending at least a portion of the received input to the G.P.S.-enabled mobile device through a communications interface;
receiving navigation information from the G.P.S.-enabled mobile device on the electronic device through the communications interface;
sensing an orientation of the G.P.S.-enabled mobile device;
displaying the received navigation information on a display of the electronic device; and
adjusting an orientation of the displayed information according to the orientation;
wherein the electronic device is a standalone device that, when connected to the G.P.S.-enabled mobile device, can provide navigation information to a user where or not the electronic device is located in an automobile.

20. The method of claim 19, wherein the receiving input from a user includes receiving voice commands.

21. The method of claim 19, wherein the receiving input from a user includes receiving a touch from a user on a touch screen of the electronic device.

22. The method of claim 19, further comprising:
receiving wireless signals from a G.P.S.-enabled mobile device;
in response to receiving the wireless signals, determining one or more communications parameters of the G.P.S.-enabled mobile device; and
establishing a communications interface between the electronic device and the G.P.S.-enabled mobile device dependent on the one or more communications parameters.

23. The electronic device of claim 1, further comprising a power supply for supplying power to the G.P.S.-enabled mobile device, wherein the power supply includes a built-in rechargeable battery configured to be charged by the automobile.

24. The method of claim 19, further comprising providing emergency assistance to the user, wherein providing emergency assistance includes:
receiving a command from the user;
using at least one of G.P.S., voice and data functionality of the G.P.S.-enabled mobile device to contact an emergency dispatch service; and
providing a hands-free audio/video communication between the user and a dispatch personnel.

25. The electronic device of claim 1, wherein the electronic device is simultaneously coupled with a plurality of consumer devices including a first consumer device and a second consumer device, wherein the communications interface is utilized to first interact with the first consumer device to perform a first action thereon and then interact with the second consumer device to perform a second action thereon.

* * * * *